United States Patent [19]
Whittaker

[11] Patent Number: 6,125,177
[45] Date of Patent: Sep. 26, 2000

[54] TELEPHONE COMMUNICATIONS NETWORK WITH ENHANCED SIGNALING AND CALL ROUTING

[75] Inventor: Richard Jonathan Whittaker, Ottawa, Canada

[73] Assignee: Nortel Networks Corporation, Montreal, Canada

[21] Appl. No.: 08/929,404

[22] Filed: Sep. 15, 1997

[51] Int. Cl.[7] .................................................. H04M 3/00

[52] U.S. Cl. ...................... 379/243; 379/207; 379/219; 379/220; 379/229; 379/230

[58] Field of Search ..................................... 370/237, 351, 370/352, 353, 354, 401, 410, 355; 379/207, 219, 220, 229, 230, 266, 242, 243; 395/200.69; 455/461

[56] References Cited

U.S. PATENT DOCUMENTS

| | | | |
|---|---|---|---|
| 5,583,922 | 12/1996 | Davis et al. | 379/207 |
| 5,610,910 | 3/1997 | Focsaneanu et al. | 370/351 |
| 5,732,078 | 3/1998 | Arango | 370/355 |
| 5,742,905 | 4/1998 | Pepe et al. | 455/461 |

*Primary Examiner*—Krista Zele
*Assistant Examiner*—Bing Bui
*Attorney, Agent, or Firm*—Michael M. Sakovich

[57] ABSTRACT

Enhanced signaling and call routing is provided in a telephone communications network that includes a local telephone central office having a POTS line connection between a subscriber station and an access junction of the office. A voice path interfaces the access junction with a circuit switch for conventional dial-up voice call placement. Modem data calls, however, follow an access path from the junction as a physical switched connection terminated in layer 1 of a network data-switching matrix. The access path continues therefrom to a data switch which interfaces an Internet service provider. Interfacing the data and circuit switches, a network controller functions to selectively configure communications paths within the central office and between the office and network in response to commands originating at the subscriber station or incoming from other networks. Additional controller functions include blocking subscriber-originated traffic from the access path and queuing incoming network-side traffic when an Internet call is on hold, invoking a tear-down of the physical switched connection to free the access path for incoming and outgoing call attempts, converting PSTN-based voice signals to an IP-based voice format and transmitting any queued data to the subscriber station followed by restoration of normal data communications.

40 Claims, 10 Drawing Sheets

Queuing Process

TELEPHONE COMMUNICATIONS NETWORK WITH ENHANCED SIGNALING AND CALL ROUTING

FIELD OF THE INVENTION

This invention relates to apparatus and a method for enhancing signaling and call routing between local and remote subscriber terminals of a telecommunications system defined by a layered hierarchy of interrelated protocols, and more particularly to facilitate switching between telephony and Internet services over a common access network.

BACKGROUND OF THE INVENTION

Enhanced telephone services in both analog voice and data communications are presently available which support a broad range of applications in the same telecommunications network. The advent of services such as CALL WAITING, CALLING LINE IDENTIFICATION and CALL FORWARDING are examples of such services utilizing currently available digital technology. Combined with the widely acclaimed multimedia communications technology represented by the Internet and its interface, World Wide Web, there is also provided a convenient and effective access to the Internet's vast catalogue of resources.

Understandably, an ever increasing use of the Internet in residential and small business environments is accompanied by a corresponding increase in the use of dial-up access. However, the use of a public switched telephone network (PSTN) for dial-up Internet access is creating new challenges for public network providers as a result of increased call holding times and an inability of network subscribers to perform any telephony functions while connected to the Internet. As a result, there is a pronounced need for telephone service subscribers to have the capability of accepting and placing telephone calls from and to the PSTN while the subscriber's telephone line is in use for non-circuit-switched communications, namely for Internet access.

Heretofore, switching between analog telephony of a plain ordinary telephone service (POTS) common access network and the dial-up Internet was generally unavailable to the POTS user. However, equipment advances in modems that are switchable between voice and data modes provide limited service in point-to-point applications, but have no regard for effects at higher protocol layers. Although multiple dissimilar services over a common access infrastructure are available through dynamic bandwidth allocation as exists in integrated services digital network (ISDN) technology, the use of such is often prohibitively expensive, especially for a residential subscriber.

Alternatively, a need to use common access facilities can be achieved by acquiring an additional subscriber line, although both cost and unavailability may obviate this option.

Internet protocol (IP) telephony permits multiplexing both voice and data over common access facilities using IP. Solutions of this nature are limited, however, in five significant ways:

(1) The call must originate from or be received on an Internet-enabled personal computer (PC);

(2) The Internet-enabled PC must be connected to the Internet to receive calls which must be transmitted through the Internet to be received;

(3) Speech quality may be impaired, at least in part, in calls using the Internet as a transport mechanism due to the effects of latency, jitter and delay;

(4) Internet-based calling currently requires either that calling parties know the Internet protocol (IP) address of the destination, requiring dialing a complex series of numbers via a telephone keypad, or that the system otherwise determine the appropriate IP address through a series of complicated lookups or through user IP address registration. In either event, existing subscribers require negotiations every time the IP address changes. A significant problem with IP address registration, moreover, is that many dial-up users have dynamically-assigned IP addresses. This means that a new address is assigned for every login by a user; and (5) Only calls that have been appropriately converted to Internet calls can be accepted which excludes traditional POTS analog calls when the line is in use.

Presently the prior art requires a POTS subscriber to tear-down their existing Internet connection before accepting a call. Two major disadvantages occur in this approach. Firstly, a current Internet session is permanently terminated. This would result in a lost IP address and lost traffic. Moreover, several attempts to reconnect may be required on a busy Internet Service Provider (ISP), together with an attendant loss of a physical port. Secondly, there is no provision for placing outgoing calls. Considering the investment of time and costs in establishing an Internet session, premature termination of the session merely to answer an incoming call, which may be unimportant, would be indeed regrettable. Furthermore, the inability to place an outgoing call while in an Internet session imposes a severe inconvenience on an Internet user.

Dual simultaneous voice and data (DSVD) modems are available which provide near toll-quality voice and data carried simultaneously between any two points employing the DSVD technology. However, this point-to-point approach does not allow the user to accept calls from the PSTN or place additional calls thereto while connected to the Internet.

A typical example of prior art is described in U.S. Pat. No. 5,287,401, Lin, issued Mar. 15, 1993 and entitled APPARATUS AND METHOD FOR A MODEM FOR DETECTING A CALL WAITING SIGNAL, which relies on existing call waiting signal detection and requires special detection circuitry within the modem for its operation. Additionally, no provisions are made for transmission time-outs which may occur at higher protocol layers. Furthermore, Lin requires a user to tear-down the modem connection to accept an incoming call, and makes no provision for placing outgoing calls.

Without providing specific apparatus for end-to-end signaling performance, the foregoing solutions will always be limited.

SUMMARY OF THE INVENTION

Having regard to the aforedescribed problems relating to signaling and call routing for a POTS subscriber connected to the Internet, a principal objective of the present invention is to provide apparatus and a method for call notification and identification on a computer system communicating with a telephone network via a modem over a common access network.

Another objective of the invention is to provide apparatus and a method for signaling the network to activate a subscriber's service and to obtain an IP address associated with an Internet service subscriber.

A further objective of the invention is to provide apparatus and a method based on the IP address obtained to automatically register and activate predetermined services for the subscriber.

Another objective of the invention is to provide apparatus and a method for call completion involving a computer system connected to the telephone network via the modem.

Yet another objective of the invention is to provide apparatus and a method by means of which data networking protocols can be suspended to support Internet connection and reconnection without data loss.

A still further objective of the invention is to provide apparatus and a method by means of which an Internet subscriber can invoke an Internet suspension or reconnection without data loss or login procedure.

Yet another objective of the invention is to provide apparatus and a method for transmitting a calling party voice message, text message, or text-to-speech message to a subscriber's computer system while the latter is connected to the telephone network via a modem and, conversely, to provide the same services to the subscriber vis-a-vis the calling party.

Still another objective of the invention is to provide apparatus and a method for the simultaneous transmission of a subscriber's voice and data without requiring proprietary apparatus at the terminal ends of the network.

A further objective of the invention is to enable an Internet service provider to periodically send messages and information updates to the subscriber, including Caller ID, Call Waiting information, general notifications and even advertising.

The problems associated with the prior art may be substantially overcome and the foregoing provisions achieved by recourse to the invention which relates in one aspect to apparatus for enhanced signaling and call routing in a first communications network that includes a local telephone central office having a POTS line communicating the domain of a first subscriber station with a first port in an access junction of the office. The apparatus comprises, in combination, a first signal path including first switching means for selectively communicating a second port of the access junction with a second communications network, a second signal path including second switching means for selectively communicating a third port of the access junction with a third communications network and control means interfacing the first and second switching means and responsive to predetermined incoming signals from the second and third networks and the subscriber station for selectively controlling the switching means to connect the station with respective ones of the first and second signal paths.

A second aspect of the invention relates to a method for enhanced signaling and call routing in a first communications network that includes a local telephone central office having a POTS line communicating the domain of a first subscriber station with a first port in an access junction of the office. The method comprises the steps of, enabling a first signal path including first switching means for selectively communicating a second port of the access junction with a second communications network, enabling a second signal path including second switching means for selectively communicating a third port of the access junction with a third communications network and interfacing the first and second switching means with control means responsive to predetermined incoming signals from the second and third networks and the subscriber station for selectively controlling the switching means to connect the station with respective ones of the first and second signal paths.

BRIEF DESCRIPTION OF THE DRAWINGS

The invention will now be more particularly described with reference to embodiments thereof shown, by way of example, in the accompanying drawings in which.

HIERARCHY OF PROTOCOL LAYERS

Figure 1:
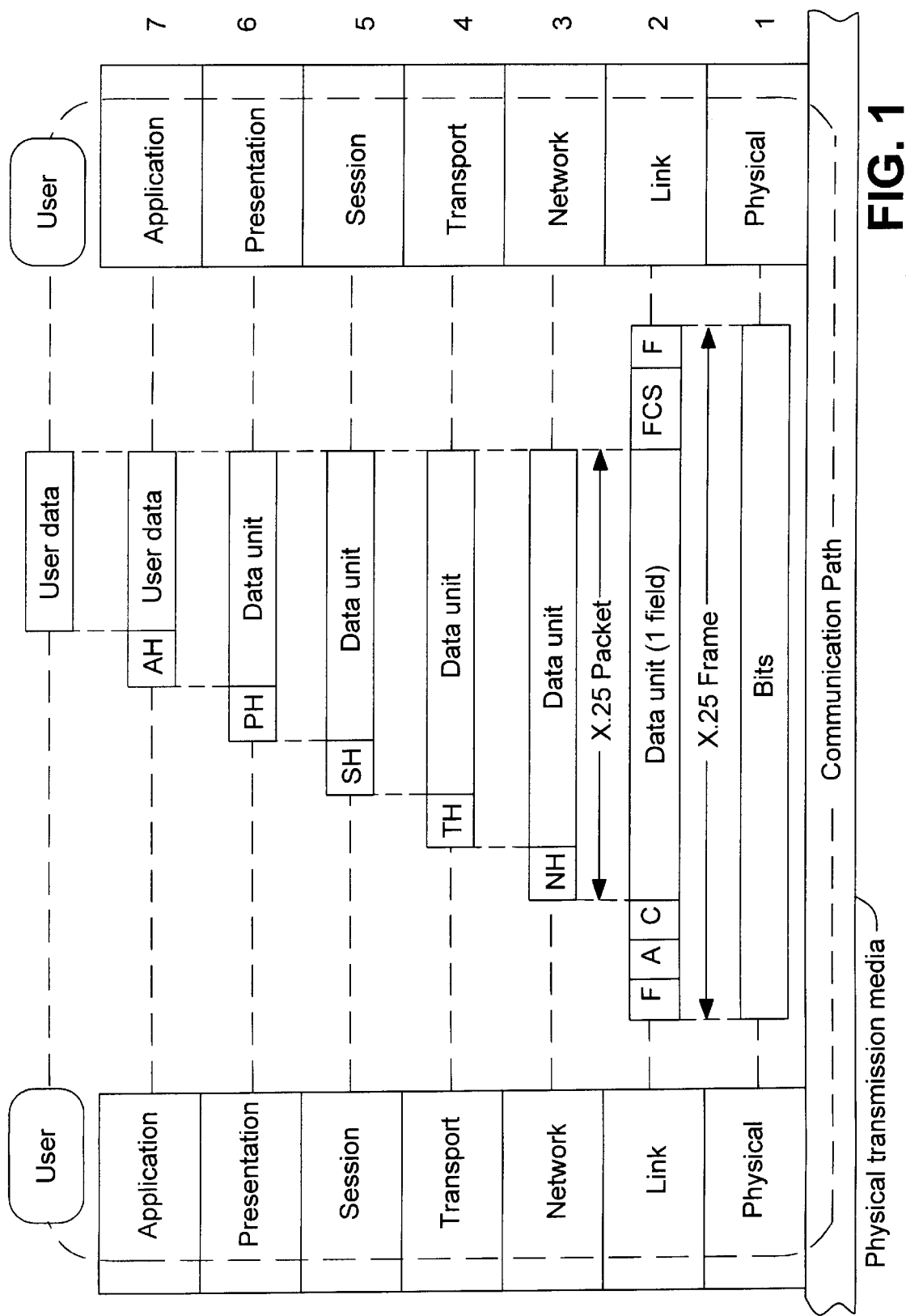
FIG. 1 is a diagram of an Open Systems Interconnection Reference Model utilized in the present invention.

Standards for voice and data applications in the same telecommunications network are based on a layered protocol concept (FIG. 1) that serves as a reference model for describing communications architecture. The generic name for the reference model is Open Systems Interconnection Reference Model (OSI/RM) as defined by the International Standards Organization (ISO) and redrafted by the International Telecommunications Union (ITU).

The OSI concept expresses a relationship between a communications network, and services supported thereby, in the form of a multilayered assembly of interrelated protocols. Each layer includes at least one function that is contained between an upper and a lower logical boundary. The services of any layer are combined with the services provided by the lower layers to create new services that are made available to the higher layers.

The present invention is directed to layers 1, 2, 3 and 4 which are concerned with the transmission, routing and switching of signals. Higher layers from 5 to 7 are concerned with the processing and use of data and are further discussed herein as, for example, accommodating suspension of other services such as File Transfer Protocol (FTP), Teletype Network (TELNET) and HyperText Transfer Protocol (HTTP).

Layer 1 is a physical layer that provides transmission of signals and the activation and deactivation of physical connections.

Layer 2 is a data link layer that includes signal synchronization, error correction, sequencing and flow control. This layer also provides a data transmission link across one or several physical connections.

Layer 3 is a network layer that provides routing and switching functions.

Layer 4 is a transport layer utilizing layers 1 to 3 to provide an end-to-end service having required characteristics for the higher layer functions.

Layer 5 is a session layer that provides the means to establish a session connection and to support an orderly exchange of data and related control functions for a particular communication service.

Layer 6 is a presentation layer that provides means for data formatting and code conversion.

Layer 7 is an application layer, the protocols of which provide the actual service sought by an end user.

DETAILED DESCRIPTION OF THE PREFERRED EMBODIMENTS

Figure 2:
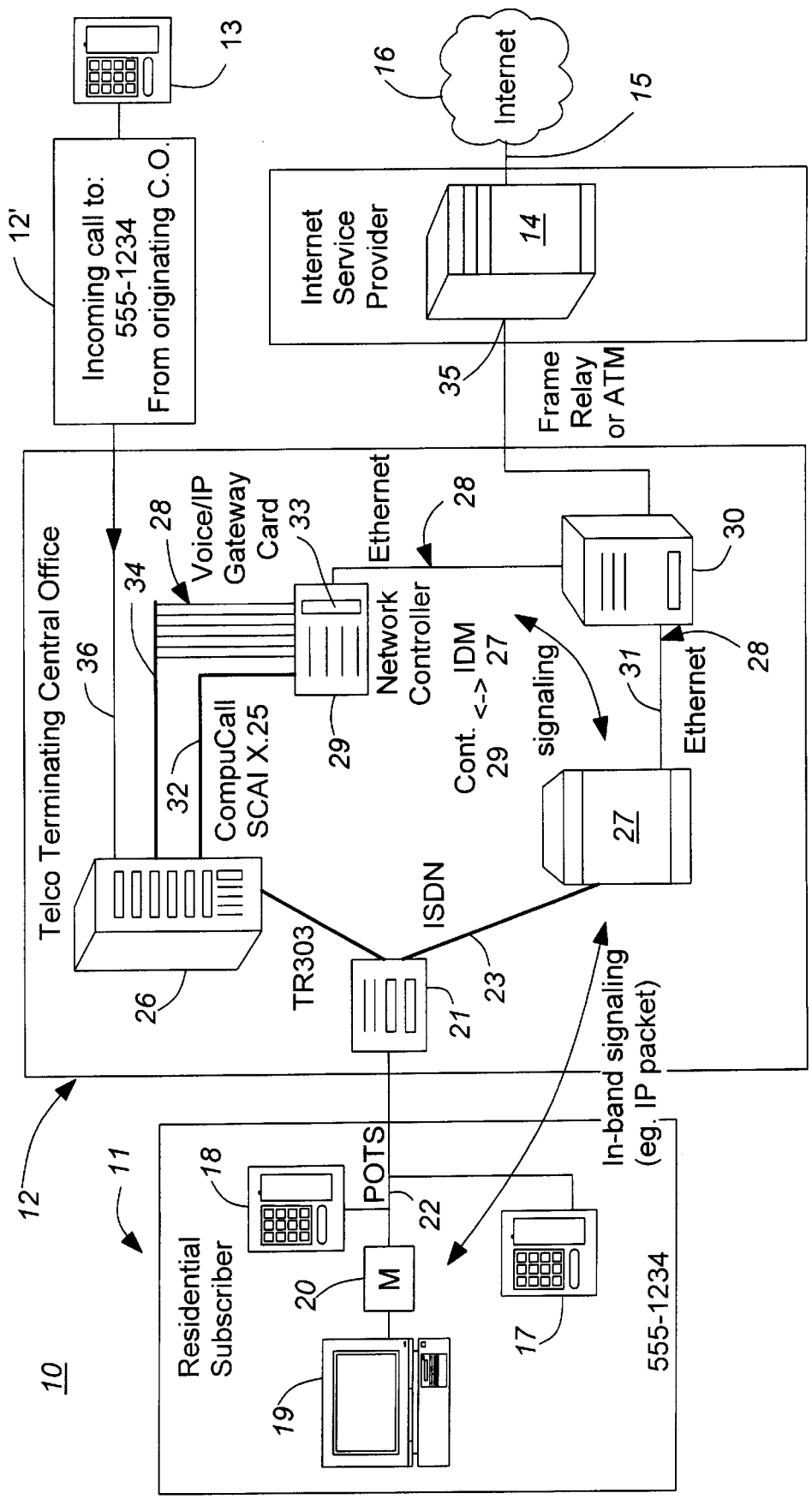
FIG. 2 is a block diagram of a telephone communications network architecture in accordance with the present invention.

FIG. 2 illustrates a block diagram of architecture which defines a telephone communications network 10 that includes the respective domains of a subscriber station 11, a public switched telephone network (PSTN) comprising first and second telephone central offices (CO) 12 and 12', respectively, a second subscriber station 13, and the domain of an Internet service provider (ISP) 14 having a communications path 15 leading to the ubiquitous Internet 16. It will be understood that the path 15 could also lead to an intranet or other data net, (not shown) depending upon specific user requirements.

The station 11 is illustrated as a residential subscriber having customer premises equipment comprising two telephone station sets 17 and 18, as well as a personal computer (PC) 19 and its modem 20. All such equipment communicates with an access interface point (AIP) 21 of the CO 12 over a single POTS telephone line 22. From the AIP 21, the line 22 is selectively connectable with an access path 23 of the CO 12 infrastructure.

In a best mode contemplated for enabling the architecture of FIG. 2, a preferred embodiment for the AIP 21 is a Northern Telecom (Nortel) ACCESSNODE* which is a next-generation digital loop carrier that provides non-blocking, non-concentrating functionality with hardware capability for dialed number recognition.

*trademark (s) of Northern Telecom (Nortel)

The AIP 21 interfaces with a signaling service point, shown in FIG. 2 as a circuit switch 26 of a known type commonly used in a CO. In keeping with the best mode enablement of the invention, a preferred switch 26 would be a Nortel DIGITAL MULTIPLEX SWITCH (DMS*). Interoperability of the DMS with other equipments in the CO 12 requires switch control software, details of which are available in Northern Telecom (Nortel) product specification NTP 297-1001-018 for DMS COMPUCALL* that is incorporated herein by reference.

* trademark(s) of Northern Telecom (Nortel)

In an illustrative example of an outgoing voice call from the station set 17 to a corresponding station set at the station 13, it will be understood that both signaling and voice data are communicated over the line 22 to the AIP 21 via a first I/O port and therefrom through a second I/O port and the switch 26, using well known techniques, to the CO 12' that services the station 13.

An alternative example of an outgoing call from the station 11 is a data call from the PC 19 through its modem 20, which likewise follows the line 22 to the AIP 21. Therefrom, however, the access path 23 is extended as a physical switched connection from a third I/O port of the AIP 21 to a physical layer 1 termination of an enhanced service interface point, shown in FIG. 2 as an Internet data-switching matrix (IDM) 27.

A preferred implementation of the IDM 27 is Northern Telecom's (Nortel) RAPPORT*, which is a dial-up switch that simplifies operations for Internet Service Providers by consolidating several point-of-presence functional elements into a single, integrated and high-performance service platform. These elements include ISDN-capable Internet Protocol (IP) servers, analog modem termination pools, terminal servers and routers.

* trademark(s) of Northern Telecom (Nortel)

The IDM 27 terminates a station 11 dial-up session with a variety of popular and known remote access protocols. With suitable known software, the RAPPORT* family of switches can accommodate more than 200 different analog modems and ISDN terminal adapters, enabling a substantial number of users to log on with existing equipment.

* trademark(s) of Northern Telecom (Nortel)

Both the switch 26 and the IDM 27 communicate over an Internet voice call services (IVCS) signaling path 28 that includes an Internet network controller 29 and a high performance, multifunctional data switch 30. A suitable controller 29 would comprise a generic computing platform such as a Digital Equipment Corporation (DEC) Alpha series, having a variety of network interfaces and running custom software implementing the signaling described hereinbelow. The switch 30 employs inter-LAN switching capabilities to receive connections from the IDM 27 and the controller 29 over an Ethernet link 31 of the path 28 and uses frame relay networking or ATM capabilities to forward such connections to the ISP 14. However, in wide-band and broad-band traffic applications, full asynchronous transfer mode (ATM) connectivity to the ISP 14 is also available from the switch 30 to achieve ATM data switching.

A preferred implementation for the switch 30 is Northern Telecom's (Nortel) PASSPORT*, which meets the requirements of performance and functionality to observe the best mode enablement of the present invention.

* trademark(s) of Northern Telecom (Nortel)

The operating program for Internet call waiting (FIG. 4) resides in memory means (not shown) of the controller 29 which interfaces with the switch 26 via a Switch to Computer Applications Interface (SCAI) 32 to receive incoming call notification and to perform rudimentary call processing. In the best mode contemplated, the switch 26 employs SCAI support via Nortel's COMPUCALL* for communication with the controller 29. A contingency to the SCAI implementation is employment of necessary signaling and call handling via the interface 32, e.g., Advanced Intelligent Network (AIN), or Telephony Applications Programming Interface (TAPI).

* trademark(s) of Northern Telecom (Nortel)

On incoming calls, the controller 29 communicates with the station 11 via in-band, IP packet signaling, whereby the incoming signal is sent to the station 11 in the subscriber's data stream. Operating software stored digitally in a hard disk (not shown) of the PC 19 detects the incoming signal and presents the subscriber with notification of an incoming call attempt that may include Calling Line ID. The subscriber then has the option of either accepting or rejecting the call, or accepting with Internet on hold.

In the event that the call is accepted, the Internet data connection is broken or suspended and the line 22 is freed. Should the subscriber 11 reject the call, however, the Internet session is unaffected. In the latter case, a calling station selectively follows the normal call progression (such as Busy) and is Call Forwarded to Voice Mail, or is attached to a custom message.

Voice calls over the Internet 16 may be placed from the station 11 via a Voice IP Gateway, shown as a network controller add-in card 33 in the controller 29. The card 33 communicates with the switch 26 over an ISDN primary access interface 34 and performs the con version of PSTN-based voice to an IP-based voice format, and vice versa, which conforms to ITU-T H-series protocol specifications. Reception of incoming voice calls from either the PSTN or an Internet-based subscriber and conversion of the calls to the appropriate outgoing media is also performed by the card 33.

Figure 3:
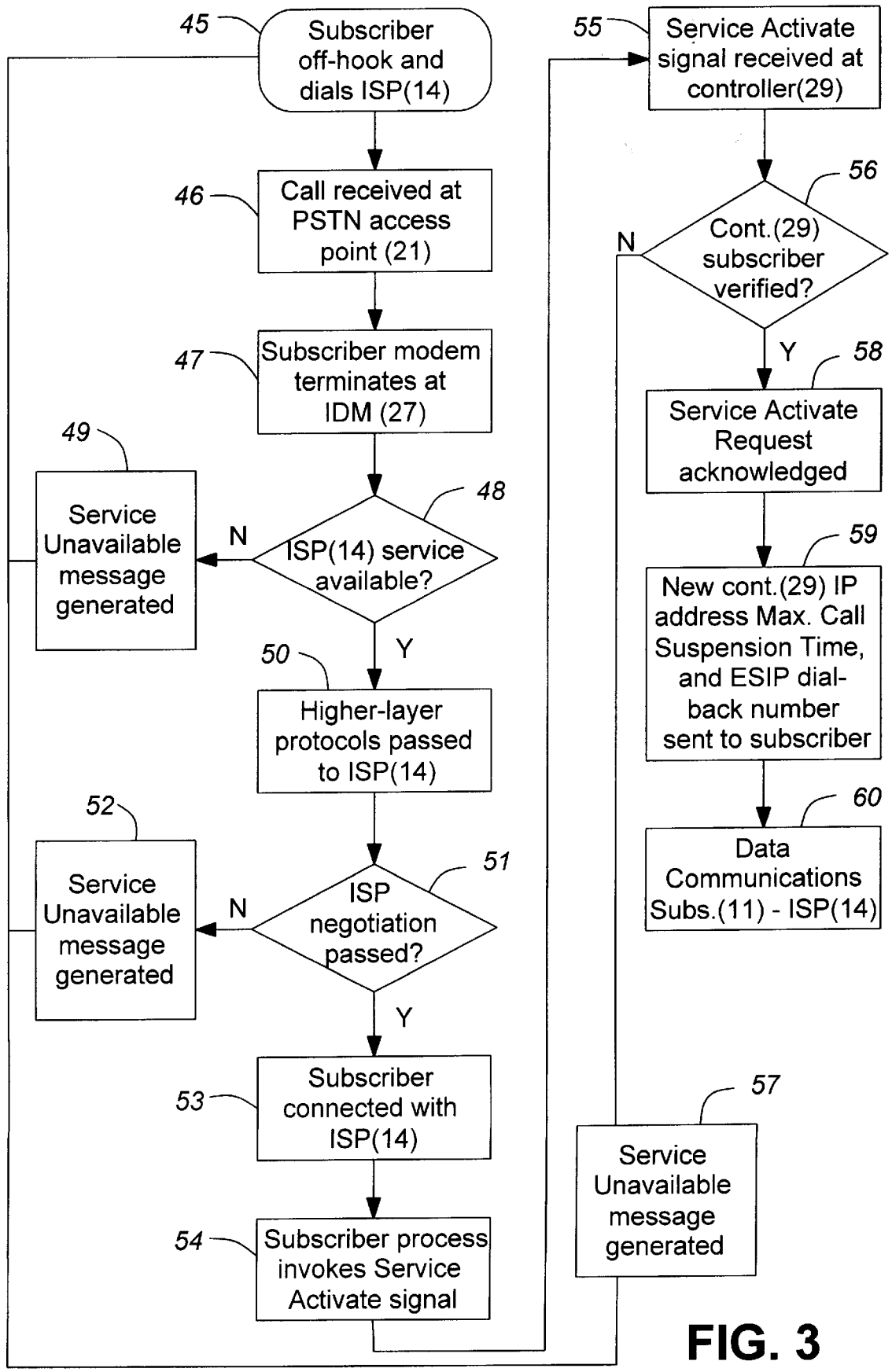
FIG. 3 is a flowchart illustrating an algorithm of an operating program stored digitally in memory means of the network for subscriber-initiated Internet service activation and data call placement.
Figure 8:
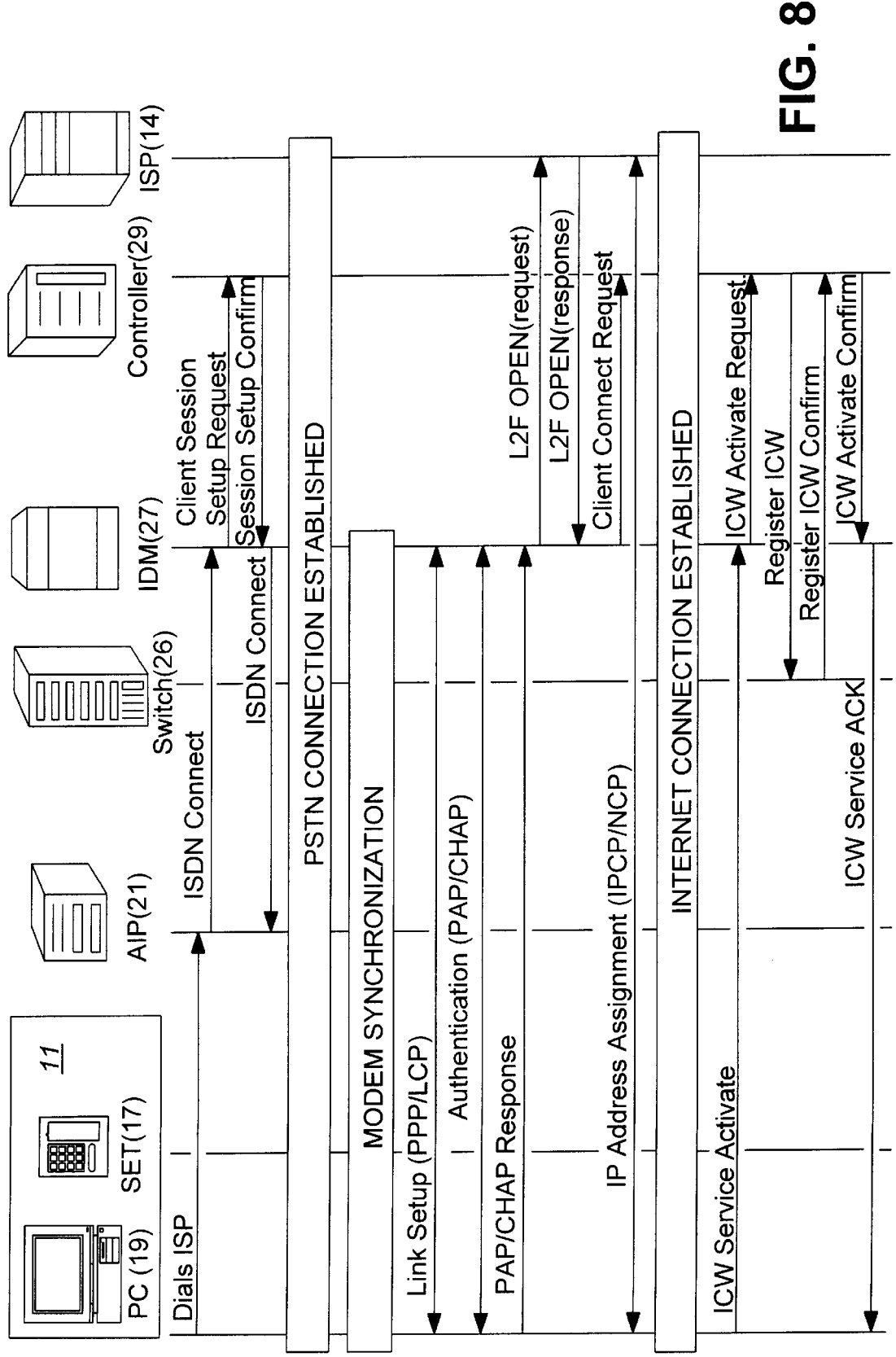
FIG. 8 is a signaling diagram of a subscriber-initiated Internet service activation and data call placement corresponding to the algorithm of FIG. 3.

FIG. 3 is a flowchart depicting an algorithm of an operating program described in greater detail hereinbelow and in the signaling diagram of FIG. 8. The program is stored digitally in the memory means (not shown) of the controller 29 for a subscriber-initiated data call placement and service activation request. Initially, the station 11 goes off-hook and dials the ISP 14 as shown in block 45. According to common and well known procedures, the call would be placed via the modem 20 of the PC 19 which communicates with the AIP 21 over the line 22 as indicated by block 46. The call is switched at the AIP 21 to the IDM 27 and, as indicated in block 47, the modem 20 terminates, via the path 23, at the physical layer 1 termination point of the IDM 27.

A decision block 48 determines if service by the ISP 14 is available. If unavailable, a corresponding signal is generated by the IDM 27 (block 49) and is coupled to the PC 19 where it is visually displayed on its monitor. In the event that ISP 14 service is available, higher layer protocols originate at the station 11 and are passed to the IDM 27. The IDM 27 sets up a mode in which subscriber signals from the station 11 go directly through the IDM 27 to the switch 30 and then to the ISP 14 in accordance with block 50. In this mode the IDM 27 is transparent to the subscriber and may be effected where required by regulatory authority. As a selective option, the IDM 27 generates signals corresponding to the subscriber signals, with the IDM 27 signals being passed on to the switch 30 and ISP 14.

Known negotiations for higher layer protocol parameters, as well as any authentication that may be necessary, is indicated in the decision block 51. Should the negotiations not be successful, a service unavailable signal is generated at the IDM 27 according to block 52 and is coupled to the PC 19 where the signal is reproduced on the PC monitor to inform the subscriber. Following successful negotiations, however, the station 11 is connected via the modem 20 with the ISP 14 along a serial path that includes the AIP 21, IDM 27 and the switch 30 in accordance with block 53.

Upon entry into the connected state, the subscriber process invokes a service activate signal at block 54 that is sent through the IDM 27 to the controller 29 as described. The controller 29 then actuates the switch 30 to connect the modem 20, via the layer 1 termination of the IDM 27, to a COMM port 35 on the user side of the ISP 14. The service activate signal includes the following information:

(1) Subscriber identifier (e.g. IP address, Point-to-Point Protocol (PPP) Client ID, etc.);
(2) Maximum Call Suspension Time (MCST); and
(3) Client directory number.

For resolution of incoming calls, the directory number may also be achieved automatically with Caller ID, wherein the IDM 27 would pass subscriber caller ID information to the controller 29 and switch 30 as part of the signal information shown in paragraph (1) above.

Following receipt of the service activate signal (block 55), the controller 29 verifies the subscriber at block 56. Without verification, the call is not terminated, but a signal, "service unavailable" is sent to the subscriber in accordance with block 57. Conversely, verification results in acknowledgement of the service activate request in accordance with block 58, followed by block 59 where the controller 29 also returns with the acknowledgement a set of parameters comprising:

(1) New controller 29 identifier (e.g. a new controller 29 IP address allowing for scaleable networks);
(2) New maximum call suspension time (MCST) in the event that the original subscriber-specified MCST exceeds the currently allowable maximum;
(3) IDM 27 dial-back number which the subscriber station 11 process would use when the subscriber wishes to reconnect to the data session following a session interruption; and
(4) Session-ID to be used for reconnection.

The result is activated service between the station 11 and the ISP 14 through which communication with the Internet 16 is achieved over the path 15 in accordance with block 60.

Figure 4:
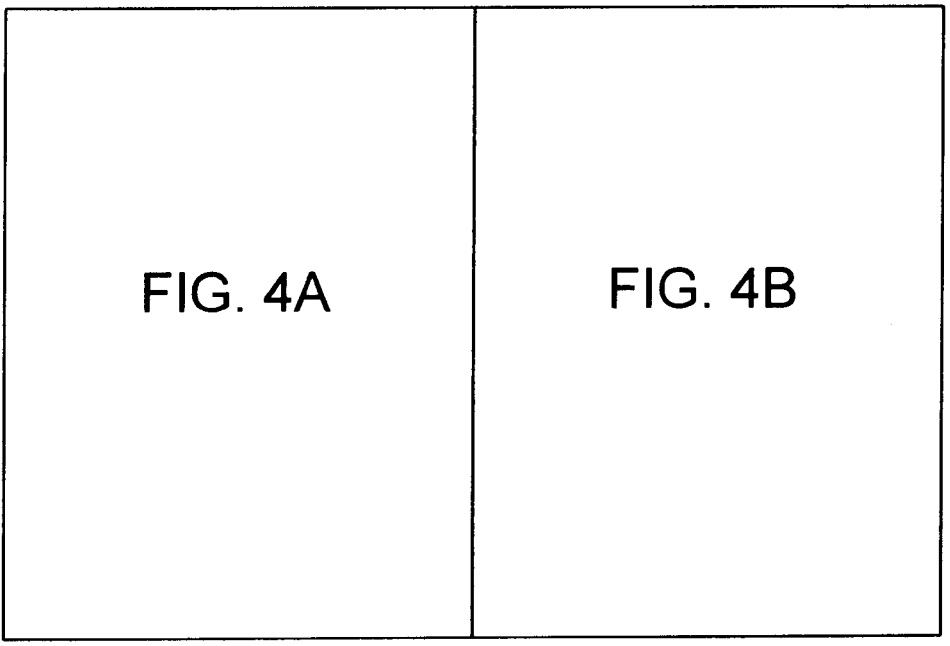
FIG. 4 is a flowchart illustrating an algorithm of an operating program stored digitally in the memory means for network-initiated placement on-hold of the Internet data call.
Figure 4A:
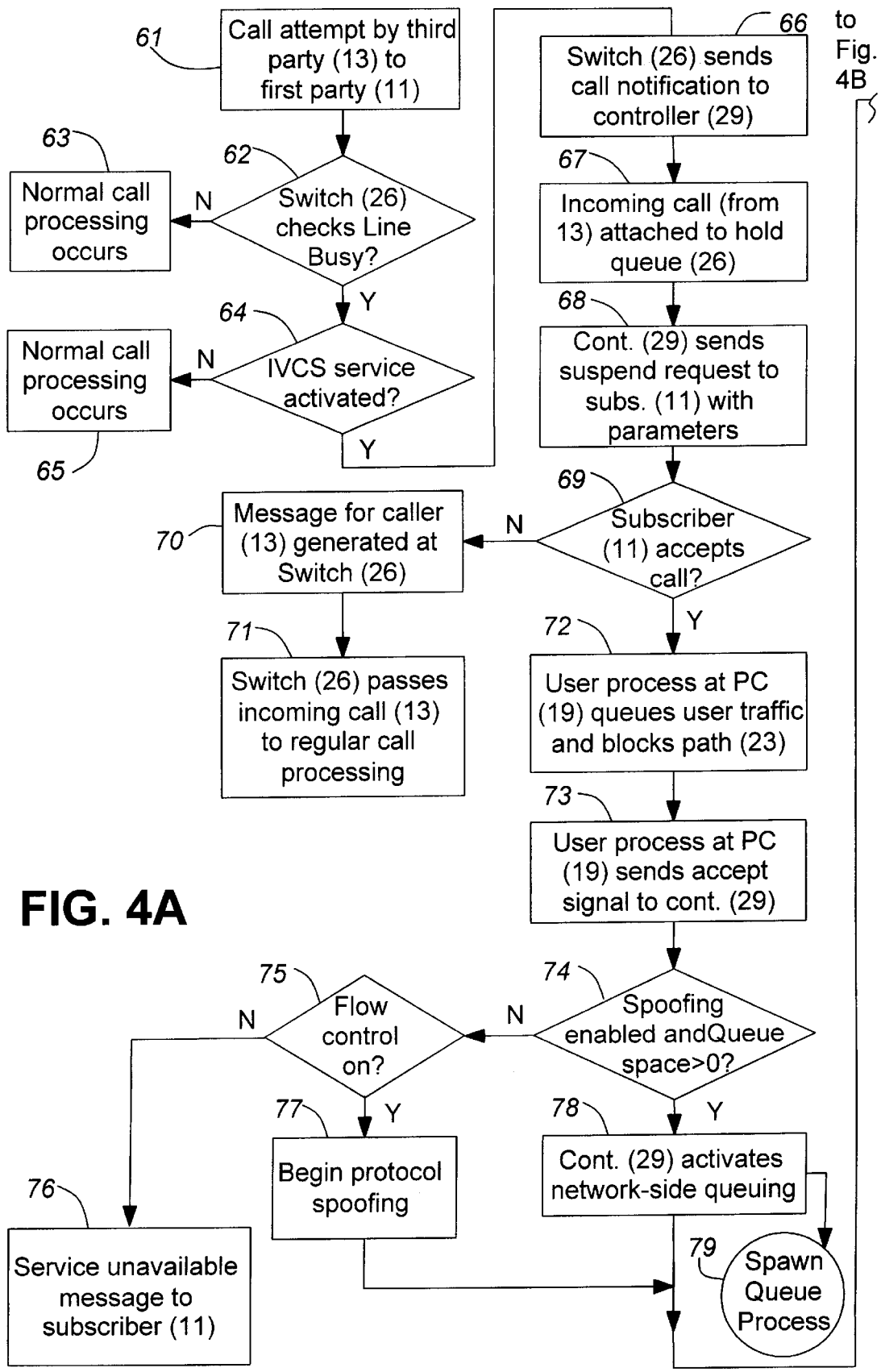
Figure 4B:
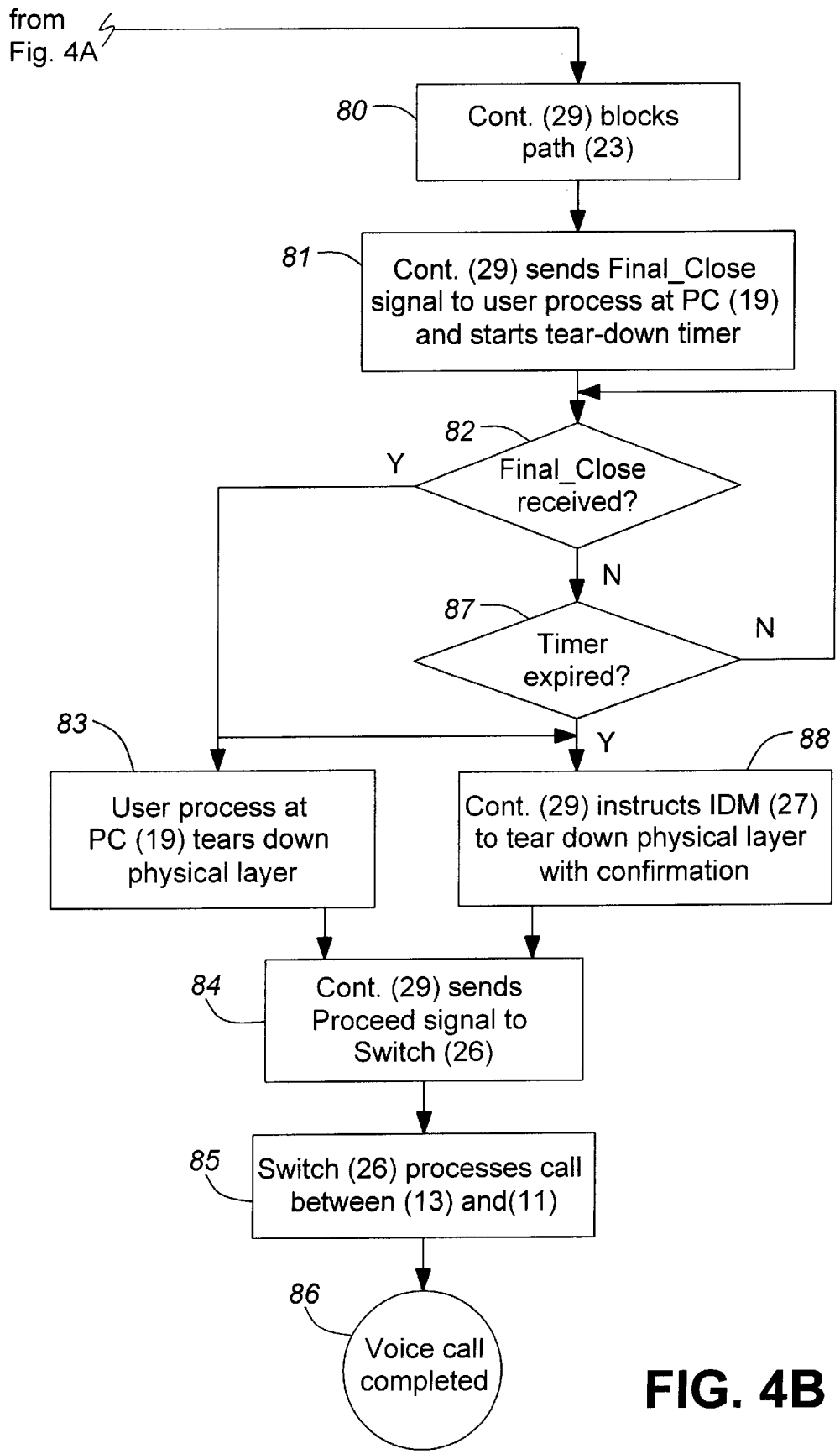

A call attempt from the station 13 to the station 11 is indicated in FIG. 4 at block 61, followed by a decision block 62 in which the switch 26 ascertains if the line 22 is busy. In the event that the line 22 is available, normal call processing occurs as shown in block 63. Should the line 22 be busy, however, a subsequent test in block 64 determines if the Internet voice call services (IVCS) feature of the present invention is activated. If the feature is not activated, normal call processing occurs as indicated in block 65. Should the IVCS feature be activated, the algorithm proceeds to block 66 where the switch 26 sends a call notification to the controller 29.

Block 67 refers to the incoming call from the station 13 along a voice and data path 36 to a hold queue at the switch 26. Although not shown, it will be understood that the hold queue utilizes a known method such as Call Park or Call Hold. Concurrently, the switch 26 signals the controller 29 which in turn sends a suspend request to the station 11 with parameters, including Caller ID, via the IDM 27 and AIP 21 as indicated in block 68.

A subsequent test at a decision block 69 determines if the station 11 accepted the call. If not accepted, a call progression tone (such as a busy signal) is generated at the switch 26 and is forwarded to the station 13 as indicated in block 70. This is followed by block 71 that shows the switch 26 passing the incoming call from the station 13 to regular call processing. Conversely, acceptance of the call by the station 11 results in activating a user process at the PC 19 whereby user traffic is queued in memory means (not shown) of the PC 19 and the path 23 is blocked in accordance with block 72.

The algorithm proceeds to block 73 where the station 11 sends an accept signal to the controller 29. Contained in that signal is information regarding the current state of the user process and network connections. This information includes the number of active Transfer Control Protocol (TCP) sessions. For each TCP session, the user process will exchange with the controller 29 the following:

(1) The current state of the TCP session;
(2) The current TCP sequence number, namely that of the last acknowledged packet; and
(3) TCP window size. TCP utilizes a sliding window protocol that among other functions solves an end-to-end flow control problem by allowing a receiver having limited buffer space to restrict data transmission until it has sufficient buffer space to accommodate more data.

A decision block 74 directs the algorithm based upon spoofing enablement and available queue space. Thus, if spoofing is not enabled and there is no queue space, a following decision block 75 determines if data flow control is active. If not active, a "service unavailable" signal is generated and sent to the station 11 per block 76.

Conversely, if flow control is active, protocol spoofing is initiated at the IDM 27 in accordance with block 77.

Protocol spoofing refers to a process wherein the normal operation of a given data protocol at a given location in the OSI 7-layer protocol stack is altered without affecting higher layer protocols. Spoofing originated as a means to prevent ISDN links from staying active for the transmission of occasional maintenance messages such as IPX keepalive messages. Thus, a device at each edge of a critical or expensive network resource would implement the spoofing protocol. When no user data was being transmitted, the edge devices would close the ISDN link, but send local keepalive acknowledgements to their respective terminals. When valid user data needed to be sent, the ISDN link would be reconnected.

Referring again to block 74, if spoofing is enabled and queue space is greater than zero, the controller 29 queues incoming network-side traffic at a hold queue thereat (block 78) and sends back an acknowledgement to the sending host. While queue space exists, as typically tested in 8 Kbyte increments, the process adjusts the right edge of the TCP window to maintain a constant flow of data. If, however, queue space is low or unavailable, the right edge of the TCP window is not adjusted. This will eventually result in a closed TCP window, whereby no further data is transmitted except for data probes. The controller 29 will acknowledge these probes to keep the session alive, but will not reopen the TCP window until the client has reconnected. A similar process is invoked on the PC 19 vis-a-vis the PC connection.

Block 79 follows where the queue process is spawned.

Normally, the spoofing software code resides in memory means (not shown) of the IDM 27 which executes protocol spoofing. An alternative solution is to store the spoofing software code in memory means of the controller 29 which executes the necessary protocol spoofing by rerouting to itself traffic normally destined to the IDM 27. This may be achieved by sending a routing request to the IDM 27 whenever the subscriber at the station 11 invokes an on-hold Internet mode.

Following the start of protocol spoofing (block 77) and queuing network-side traffic (block 78), the controller 29 blocks the path 23 to network-side traffic according to block 80.

A typical protocol suspension or spoofing comprises a point-to-point protocol, also referred to as Protocol Spoofing Control Protocol (PSCP), which is available as a product of the Point-to-Point Protocol Working Group of the Internet Engineering Task Force (IETF). Specific reference is made to an Internet Draft, incorporated herein by reference, which is a publicly available working draft document, dated February, 1996, produced by the Network Working Group, Puleston, Global Village Communication (UK) Ltd.

The PSCP protocol provides a standard method for transporting multi-protocol datagrams over point-to-point links as in the network of FIG. 2. This protocol is described as a Control Protocol which allows the opposite ends of a connection to agree to carry out protocol spoofing when an idle link is temporarily disconnected in order to save on connection charges. The described method is applicable to any situation in which a point-to-point connection is made over a link which can be temporarily suspended for any reason. The spoofing software code thus simulates an end-to-end data connection by responding to network-side traffic and handling various network-specific timers. Higher layer protocols beyond layer 2 are also suspended using similar, current methods as may be required. For example, in Transmission Control Protocol (TCP), window size may be reduced, data flow control employed, timers may be disabled and acknowledgements spoofed.

After blocking the path 23, a final close signal is sent by the controller 29 to the user process at the PC 19 in station 11, followed by starting a tear-down timer as shown in block 81.

Block 82 determines if the final close signal was received at the station 11. An affirmative indication results in a tear-down of the physical layer 1 connection at the IDM 27 by the PC 19 as indicated in block 83. This is followed by block 84 at which the controller 29 sends a proceed signal to the switch 26. In block 85 the switch 26 processes the call between the station 13 and the station 11, and the voice call is shown as completed in block 86.

Referring again to the block 82, should the final close signal not be received, the algorithm proceeds to a test in block 87 to ascertain whether the tear-down timer has expired. If not expired, the algorithm returns to the input of the block 82. However, if the timer has expired, the algorithm continues to block 88 where the controller 29 instructs the IDM 27 to tear down the physical layer 1 connection, with confirmation. The algorithm then proceeds through blocks 84, 85 and 86 as described.

Figure 5:
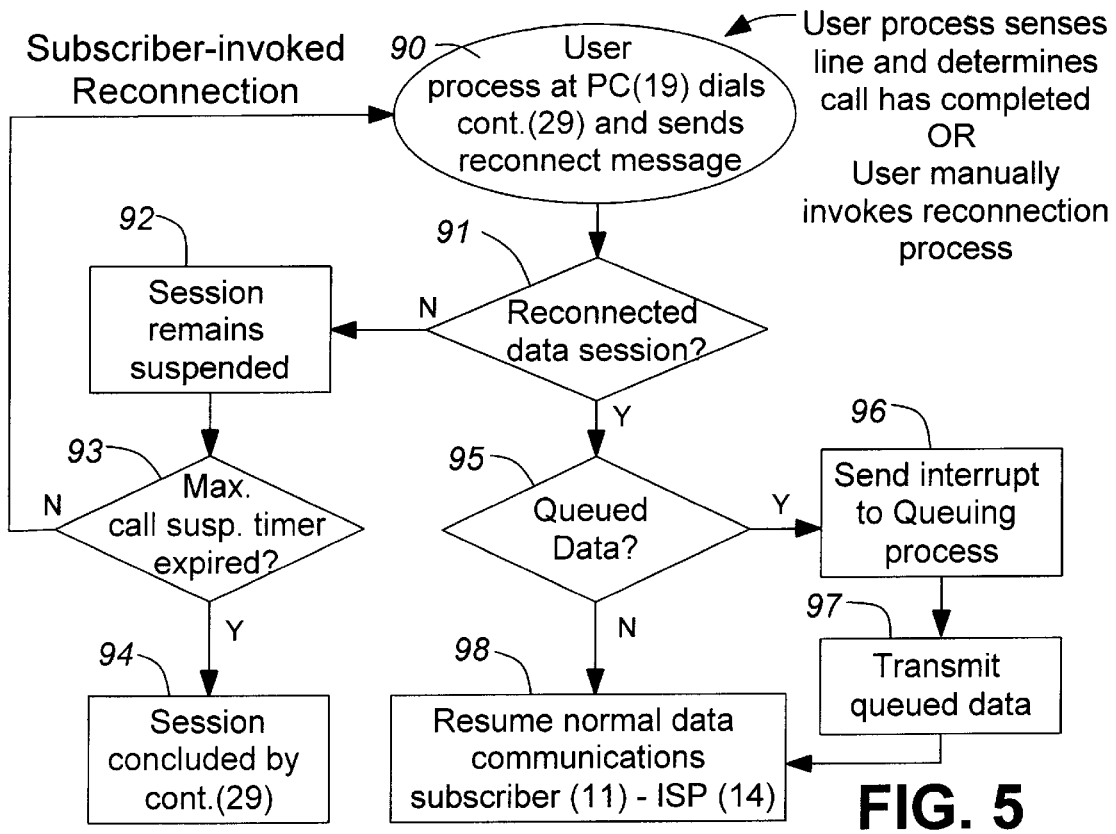
FIG. 5 is a flowchart illustrating an algorithm of an operating program stored digitally in the memory means for subscriber-invoked reconnection of an on-hold Internet data call initiated by the subscriber.
Figure 9:
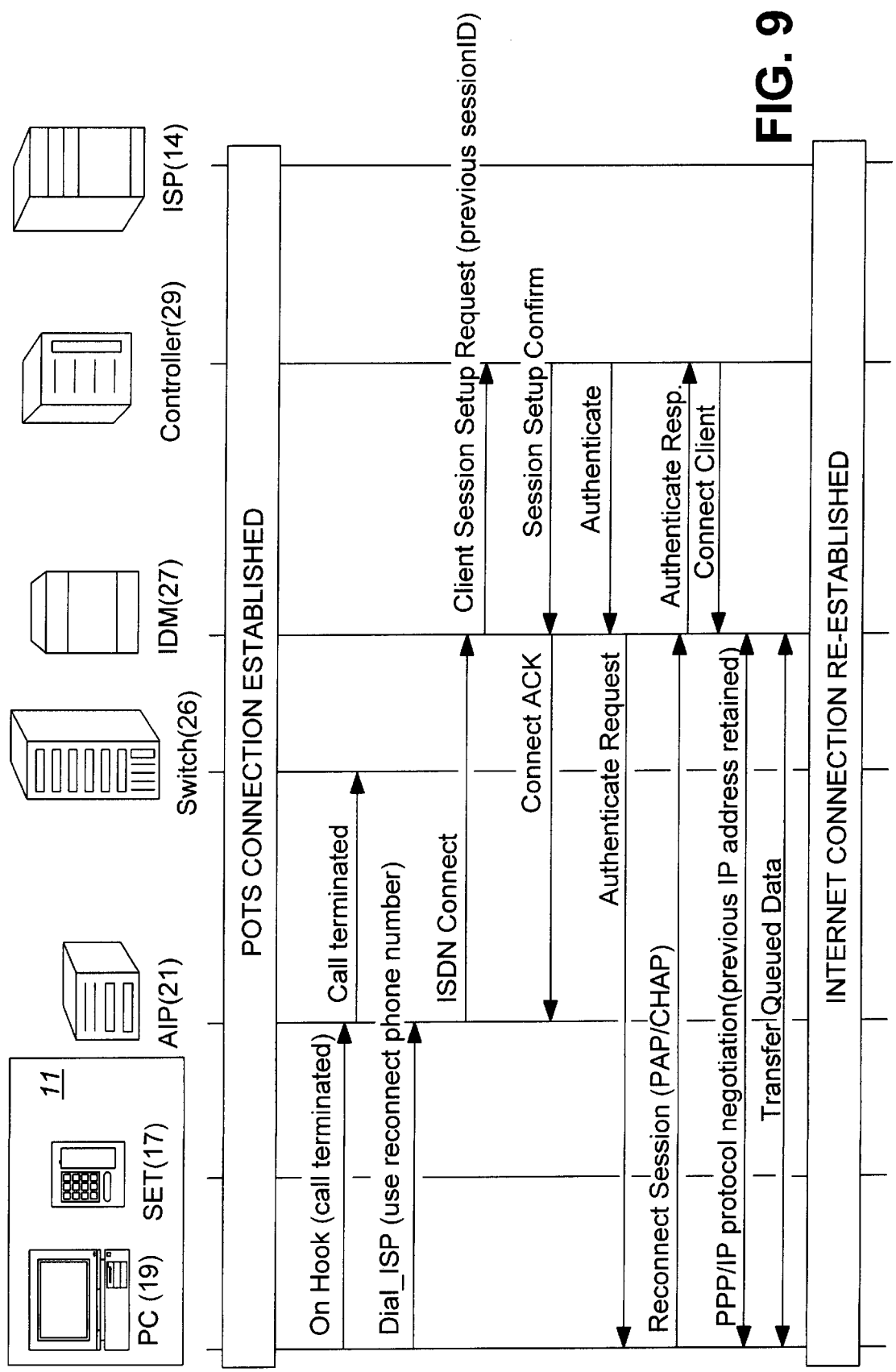
FIG. 9 is a signaling diagram of a subscriber-invoked reconnection of an on-hold Internet data call corresponding to the algorithm of FIG. 5.

Following completion of the voice call, the PC 19 is activated by its digitally stored program and senses the line 22 to determine if the accepted call has ended. Alternatively, the subscriber at station 11 manually invokes a reconnection process according to the signaling diagram of FIG. 9. In either event, the PC 19 dials the controller 29 via the switch 26 as shown in FIG. 5 (block 90) and sends a reconnect signal to resume normal data communications. A decision block 91 follows to ascertain if the data session has been reconnected. No reconnection leads to block 92 where the session remains suspended, followed by block 93 which determines if the maximum call suspension timer has expired. If not expired, the algorithm returns to the input of block 91. On timer expiration, the session is terminated by the controller 29 in block 94.

Reconnection of the data session is determined in block 91 and requires reestablishing the physical layer 1 termination at the IDM 27. This leads to a further test in a decision block 95 to ascertain the presence of queued data at the hold queue in the controller 29. If present, an interrupt signal is sent to the queuing process (block 96) at the controller 29. The queued data is then transmitted (block 97) to the station 11 via the switch 30, IDM 27 and AIP 21, and normal data communications between the station 11 and ISP 14 resumes according to block 98.

When the user process has reconnected, the controller 29 will begin to transfer the TCP sessions back to the subscriber at the station 11. The controller thus begins transmitting queued data from the point at which the user process left off, namely the state at handoff time. The user process will not, however, begin transmitting data until signaled by the controller 29. During the resynchronization period that follows, TCP probes will continue to be sent from the Internet 16. The TCP probes will be acknowledged, but the TCP window will remain closed. After all traffic from the Internet has been sent to the user process, the controller 29 will send an acknowledgement to the Internet 16 host that includes the TCP window size of the PC 19 as determined from subscriber provided original state information. At this point, the controller 29 will remove itself from the active traffic stream and let normal data communications resume between the station 11 and the Internet 16.

The absence of queued data, as determined in block 95, likewise leads the algorithm into resuming normal data communications between the station 11 and the ISP 14 as indicated in block 98.

Figure 6:
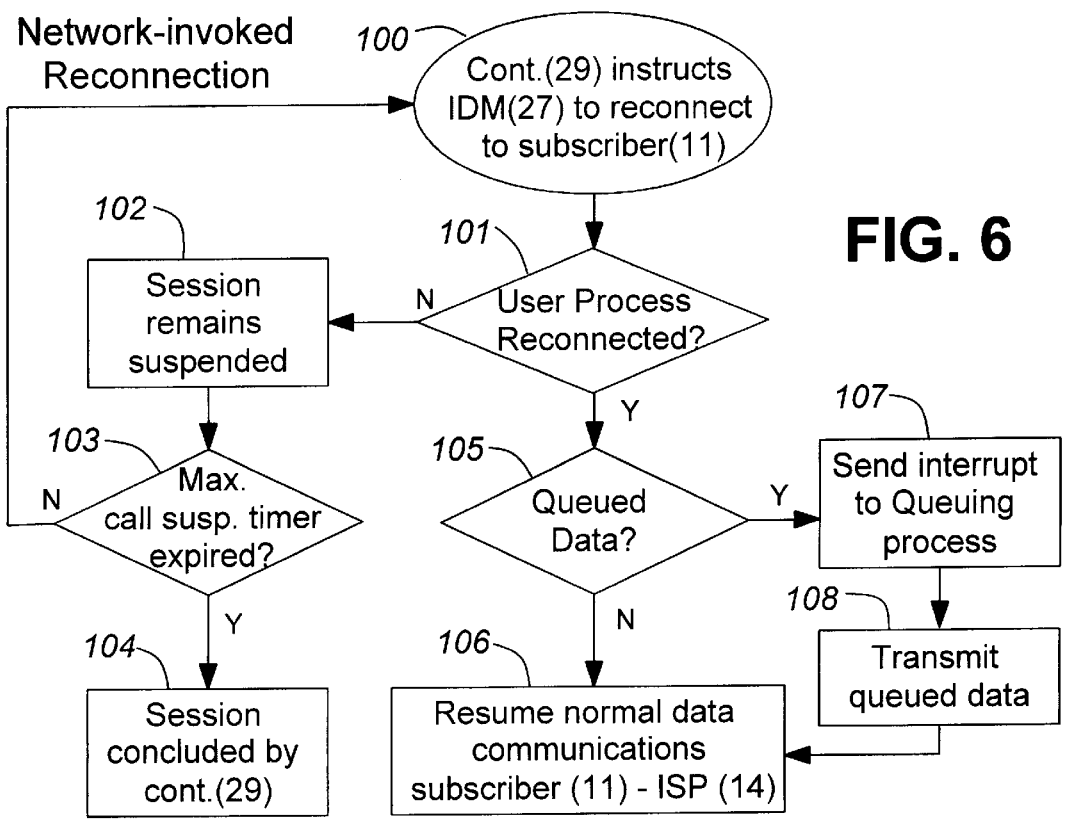
FIG. 6 is a flowchart illustrating an algorithm of an operating program stored digitally in the memory means for network-invoked reconnection of the on-hold Internet data call of FIG. 4.

A network-invoked reconnection is illustrated in the flowchart of FIG. 6. Initially, the controller 29 instructs the IDM 27 to reconnect to the station 11 as indicated in block 100. Block 101 follows, in which it is determined if the user data process has been reconnected. If not reconnected, the data session remains suspended as shown in block 102. This is followed by block 103 which ascertains if the maximum call suspension timer has expired. If not expired, the algorithm returns to the input of block 101. Expiration of the timer, however, leads to block 104 where the session is concluded by the controller 29.

A determination in block 101 that the user data session on the Internet 16 has been reconnected leads to a decision block 105 which tests for the presence of queued data. The absence of queued data directs the algorithm to block 106 where normal data communications between the station 11 and ISP 14 is resumed.

If queued data is present, the algorithm sends an interrupt signal to the queuing process at the controller 29 according to block 107. In response to the interrupt signal, the controller 29 transmits the queued data according to block 108 which results in the resumption of normal data communications between the station 11 and the ISP 14 in block 106 as described previously for block 98 in FIG. 5.

Figure 7:
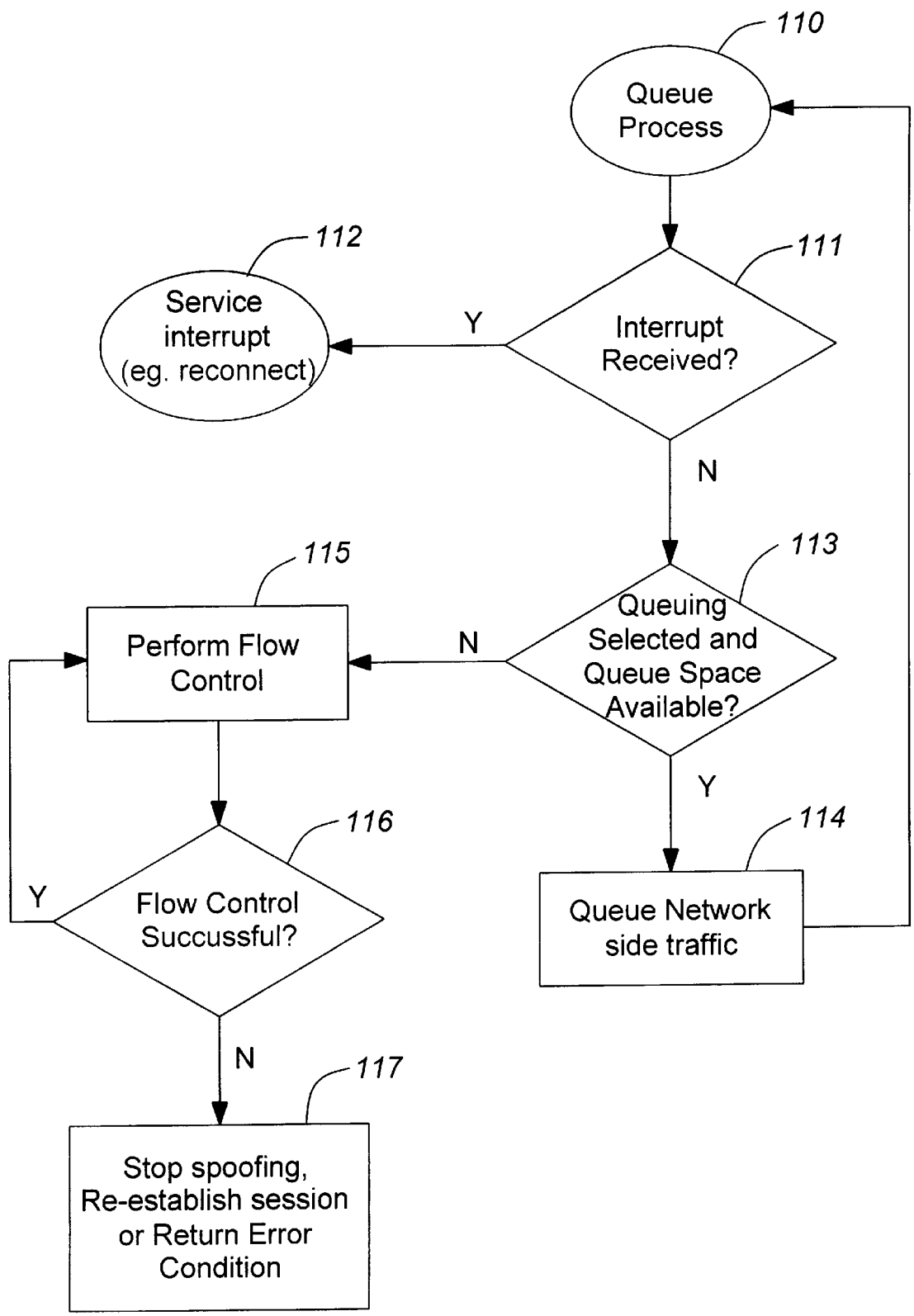
FIG. 7 is a flowchart illustrating an algorithm of an operating program stored digitally in the memory means for implementing data queuing in the algorithm of FIG. 4.

The aforementioned queuing process is illustrated in the flowchart of FIG. 7. The process initiates at the controller 29 (block 110) and proceeds to a decision block 111 to test if an interrupt signal from either block 96 (FIG. 5) or block 107 (FIG. 6) has been received. Reception of the interrupt signal leads to block 112 where it is serviced to establish reconnect, as shown.

If an interrupt signal was not received according to block 111, a further decision block 113 follows where it is determined if queuing has been selected and queue space is available. Should the queue space be sufficient (shown here as greater than zero) and queuing selected, the algorithm proceeds to block 114 from which a queue network-side traffic signal is sent to the controller 29 and network-side traffic is stored in memory means thereof, such as a hard disk (not shown). Similarly, a queuing process may also be invoked on the PC 19 vis-a-vis the user-side connection.

In the absence of queue space, or through specific selection, block 115 invokes data flow control which is subsequently tested in block 116. This test involves the examination of incoming traffic to ascertain predetermined responses and acknowledgements in respect of block 80. Successful flow control according to block 116 results in continuation thereof according to block 115. Unsuccessful flow control, on the other hand, leads to block 117 at which spoofing is stopped at the IDM 27 and the Internet data session reestablished in the manner previously described. Alternatively, a return error condition signal is generated.

The embodiments of the invention hereinabove described rely on block diagrams and flowcharts to describe various network architecture and their respective functions as well as circuits that would be known to those individuals skilled in the art to whom this specification is addressed, although not in the novel combinations disclosed. Accordingly, the foregoing constitutes a sufficient description to such individuals for a comprehensive understanding of the best mode contemplated to give effect to the embodiments as disclosed and claimed herein. Although program listings have not been included to disclose the precise manner of digital computer programming to perform the operations desired, the detailed functional descriptions presented herein, together with related flowcharts, would permit a skilled computer programmer to program the PC 19, switch 26 and the controller 29 to perform all required operations.

To those same individuals skilled in the art, it will be evident that the embodiments heretofore described may be varied to meet particular specialized requirements without departing from the true spirit and scope of the invention disclosed. These embodiments are therefore not to be taken as indicative of the limits of the invention but rather as exemplary structures thereof which is described by the claims appended hereto.

What is claimed is:

1. Apparatus for enhanced signaling and call routing in a first communications network that includes a local telephone central office having a POTS line communicating the domain of a first subscriber station with a first port in an access junction of the office, comprising in combination:

a first signal path including first switching means for selectively communicating a second port of the access junction with a second communications network;

a second signal path including second switching means for selectively communicating a third port of the access junction with a third communications network;

control means interfacing the first and second switching means and responsive to predetermined incoming signals from the second and third networks and the subscriber station for selectively controlling the switching means to connect the station with respective ones of the first and second signal paths; and means for acknowledging a service activate signal having a maximum call suspension time received at the control means from the first subscriber station and enabling the second switching means to complete the second signal path between the third communications network and the first subscriber station in response thereto, the acknowledgement including a set of parameters comprising:

a new controller identifier in the form of a new third network address allowing for scaleable networks;

a new maximum call suspension time should the original subscriber-specified time exceed a currently allowable maximum; and data session identification to be used for reconnection by the first subscriber station.

2. Apparatus as claimed in claim 1, further comprising:

a data-switching matrix forming part of the second signal path; and an access path comprising a physical switched connection from the third port of the access junction to a physical layer termination at the matrix.

3. Apparatus as claimed in claim 2, wherein the first switching means comprises a circuit switch operably responsive to a dial-up service request signal from the station for connecting the first signal path to a selected node in the second communications network.

4. Apparatus as claimed in claim 3, further comprising:

means for configuring the matrix as one of, a relay or a transparent connection to selectively communicate first subscriber station command signals from the access junction to at least one of the matrix and control means.

5. Apparatus as claimed in claim 4, further comprising means for reversibly converting PSTN-based voice signals to an IP-based voice format for transmission and reception over the third communications network.

6. Apparatus as claimed in claim 4, wherein the second switching means comprises a data switch interfacing the matrix and a service provider of the third communications network.

7. Apparatus as claimed in claim 6, further comprising means for terminating a modem of the first subscriber station at the physical layer termination and connecting the modem therefrom via the data switch to the service provider in response to a corresponding dial-up service request signal from the first subscriber station.

8. Apparatus as claimed in claim 7, further comprising:

means for ascertaining the availability of the service provider; and means responsive to the availability of the service provider for generating higher layer protocols at the first subscriber station and communicating the protocols through the matrix and data switch to the service provider.

9. Apparatus as claimed in claim 8, further comprising:

means for negotiating higher layer protocol parameters with the service provider and ascertaining a successful conclusion to such negotiation prior to connecting the modem thereto.

10. Apparatus as claimed in claim 9, wherein the control means comprises a network controller, the apparatus further comprising:

means for invoking the service activate signal at the first subscriber station;

means for sending the service activate signal to the controller; and means for verifying the legal status of the subscriber station invoking the service activate signal before activating service with the service provider.

11. Apparatus as claimed in claim 10, wherein the service activate signal comprises:

a subscriber identifier including a third network address, point-to-point protocol and client identification; and a client directory number.

12. Apparatus as claimed in claim 11, further comprising:

a first hold queue disposed within the circuit switch;

means for notifying the controller of a call attempt received by the circuit switch from a second subscriber station and directing the incoming call to the first hold queue;

means responsive to the incoming call for sending a suspend request signal to the first subscriber station with caller identification via the matrix and the access junction;

a second hold queue disposed within the controller; and means responsive to acceptance of the incoming call by the first subscriber station for invoking an on-hold network mode that includes blocking the access path and queuing incoming traffic received at the data switch from the third communications network.

13. Apparatus as claimed in claim 12, further comprising:

means for enabling protocol spoofing, spawning the queue process by the controller and queuing incoming traffic received at the controller from the third communications network.

means for enabling the controller to send a final close signal to the first subscriber station;

means for initiating a tear-down of the physical layer connection at the matrix by the first subscriber station in response to the received final close signal; and means for enabling the circuit switch to proceed with processing the call between the first and second subscriber stations, with the third communications network call on-hold.

14. Apparatus as claimed in claim 13, further comprising:

means for sending a dial-up reconnect signal from the first subscriber station to the controller and reestablishing the physical layer connection at the matrix in response thereto;

means for detecting the absence of queued data at the second hold queue; and means responsive to the detected absence of data at the second hold queue for resuming normal data communications between the first subscriber station and the service provider.

15. Apparatus as claimed in claim 13, further comprising:

means for detecting the end of the incoming call;

means responsive to the end of the call for enabling the controller to instruct the matrix to reconnect to the first subscriber station;

means for detecting the presence of queued data at the second hold queue and sending an interrupt signal to the controller in response thereto; and means responsive to the received interrupt signal for transmitting the queued data from the controller to the first subscriber station via the data switch, matrix and access junction.

16. Apparatus as claimed in claim 15, further comprising:

means responsive to the transmitted queued data for reestablishing the physical layer connection at the matrix and resuming normal data communications between the first subscriber station and the service provider.

17. Apparatus as claimed in claim 13, further comprising:

means for detecting the end of the incoming call;

means responsive to the end of the call for enabling the controller to instruct the matrix to reconnect to the first subscriber station;

means for detecting the absence of queued data at the second hold queue; and means operably responsive to the detected absence of data at the second hold queue for reestablishing the physical layer connection at the matrix and resuming normal data communications between the first subscriber station and the service provider.

18. Apparatus as claimed in claim 13, further comprising:

means for sending a dial-up reconnect signal from the first subscriber station to the controller and reestablishing the physical layer connection at the matrix in response thereto;

means for detecting the presence of queued data at the second hold queue and sending an interrupt signal to the controller in response thereto; and means responsive to the received interrupt signal for transmitting the queued data from the controller to the first subscriber station via the data switch, matrix and access junction.

19. Apparatus as claimed in claim 18, further comprising:

means responsive to the transmitted queued data for resuming normal data communications between the first subscriber station and the service provider.

20. Apparatus as claimed in claim 18, wherein the means for enabling protocol spoofing and spawning the queue process by the controller comprises:

first test means for detecting receipt or non-receipt of an interrupt signal at the controller;

first circuit means responsive to non-receipt of the interrupt signal for interrupting service to the first subscriber station;

second test means for detecting queuing selection and the presence of available queue space at the second hold queue;

second circuit means responsive to queuing selected and available queue space for sending an instruction to the controller to queue network-side traffic; and memory means to which the traffic is directed and temporarily stored during said service interruption.

21. Apparatus as claimed in claim 20, further comprising:

data flow control means for examining incoming traffic for predetermined spoofing responses and acknowledgements in response to one of, the detected absence of queue space or specific selection; and means for disabling the protocol spoofing means and invoking one of, session reestablishment at the first subscriber station or generation of a return error condition signal thereat in response to specific selection or the absence of the predetermined spoofing responses and acknowledgements.

22. A method for enhanced signaling and call routing in a first communications network that includes a local telephone central office having a POTS line communicating the domain of a first subscriber station with a first port in an access junction of the office, the method comprising the steps of:

enabling a first signal path including first switching means for selectively communicating a second port of the access junction with a second communications network;

enabling a second signal path including second switching means for selectively communicating a third port of the access junction with a third communications network;

interfacing the first and second switching means with control means responsive to predetermined incoming signals from the second and third networks and the subscriber station for selectively controlling the switching means to connect the station with respective ones of the first and second signal paths; and acknowledging a service activate signal having a maximum call suspension time received at the control means from the first subscriber station and enabling the second switching means to complete the second signal path between the third communications network and the first subscriber station in response thereto, the acknowledgement including a set of parameters comprising:

a new controller identifier in the form of a new third network address allowing for scaleable networks;

a new maximum call suspension time should the original subscriber-specified time exceed a currently allowable maximum; and data session identification to be used for reconnection by the first subscriber station.

23. A method as claimed in claim 22, wherein the first communications network further includes a data-switching matrix forming part of the second signal path, an access path comprising a physical switched connection from the third port of the access junction to a physical layer termination at the matrix and wherein the first switching means comprises a circuit switch, the method comprising the further step of:

enabling the circuit switch to operably respond to a dial-up service request signal from the station for connecting the first signal path to a selected node in the second communications network.

24. A method as claimed in claim 23, comprising the further step of:

configuring the matrix as one of, a relay or a transparent connection to selectively communicate first subscriber station command signals from the access junction to at least one of the matrix and control means.

25. A method as claimed in claim 24, comprising the further step of reversibly converting PSTN-based voice signals to an IP-based voice format for transmission and reception over the third communications network.

26. A method as claimed in claim 24, wherein the second switching means comprises a data switch interfacing the matrix and a service provider of the third communications network, the method comprising the further step of:

terminating a modem of the first subscriber station at the physical layer termination and connecting the modem therefrom via the data switch to the service provider in response to a corresponding dial-up service request signal from the first subscriber station.

27. A method as claimed in claim 26, comprising the further steps of:

ascertaining the availability of the service provider; and generating higher layer protocols at the first subscriber station and communicating the protocols through the matrix and data switch to the service provider in response to the availability of the service provider.

28. A method as claimed in claim 27, comprising the further step of:

negotiating higher layer protocol parameters with the service provider and ascertaining a successful conclusion to such negotiation prior to connecting the modem thereto.

29. A method as claimed in claim 28, wherein the control means comprises a network controller, the method comprising the further steps of:

invoking the service activate signal at the first subscriber station;

sending the service activate signal to the controller; and verifying the legal status of the subscriber station invoking the service activate signal before activating service with the service provider.

30. A method as claimed in claim 29, wherein the service activate signal comprises:

a subscriber identifier including a third network address, point-to-point protocol and client identification; and a client directory number.

31. A method as claimed in claim 30, wherein the first communications network further includes a first hold queue disposed within the circuit switch and a second hold queue disposed within the controller, the method comprising the further steps of:

notifying the controller of a call attempt received by the circuit switch from a second subscriber station and directing the incoming call to the first hold queue;

sending a suspend request signal to the first subscriber station with caller identification via the matrix and the access junction in response to the incoming call; and invoking an on-hold network mode that includes blocking the access path and queuing incoming traffic received at the data switch from the third communications network in response to acceptance of the incoming call by the first subscriber station.

32. A method as claimed in claim 31, comprising the further steps of:

enabling protocol spoofing, spawning the queue process by the controller and queuing incoming traffic received at the controller from the third communications network;

enabling the controller to send a final close signal to the first subscriber station;

initiating a tear-down of the physical layer connection at the matrix by the first subscriber station in response to the received final close signal; and enabling the circuit switch to proceed with processing the call between the first and second subscriber stations, with the third communications network call on-hold.

33. A method as claimed in claim 32, comprising the further steps of:

sending a dial-up reconnect signal from the first subscriber station to the controller and reestablishing the physical layer connection at the matrix in response thereto;

detecting the absence of queued data at the second hold queue; and resuming normal data communications between the first subscriber station and the service provider in response to the detected absence of data at the second hold queue.

34. A method as claimed in claim 32, comprising the further steps of:

detecting the end of the incoming call;

enabling the controller to instruct the matrix to reconnect to the first subscriber station in response to the end of the call;

detecting the presence of queued data at the second hold queue and sending an interrupt signal to the controller in response thereto; and transmitting the queued data from the controller to the first subscriber station via the data switch, matrix and access junction in response to the received interrupt signal.

35. A method as claimed in claim 34, comprising the further step of:

reestablishing the physical layer connection at the matrix and resuming normal data communications between the first subscriber station and the service provider in response to the transmitted queued data.

36. A method as claimed in claim 32, comprising the further steps of:

detecting the end of the incoming call;

enabling the controller to instruct the matrix to reconnect to the first subscriber station in response to the end of the call;

detecting the absence of queued data at the second hold queue; and reestablishing the physical layer connection at the matrix and resuming normal data communications between the first subscriber station and the service provider in response to the detected absence of data at the second hold queue.

37. A method as claimed in claim 32, comprising the further steps of:

sending a dial-up reconnect signal from the first subscriber station to the controller and reestablishing the physical layer connection at the matrix in response thereto;

detecting the presence of queued data at the second hold queue and sending an interrupt signal to the controller in response thereto; and transmitting the queued data from the controller to the first subscriber station via the data switch, matrix and access junction in response to the received interrupt signal.

38. A method as claimed in claim 37, comprising the further step of:

resuming normal data communications between the first subscriber station and the service provider in response to the transmitted queued data.

39. A method as claimed in claim 37, wherein the step of enabling protocol spoofing and spawning the queue process by the controller includes the prior steps of:

detecting receipt or non-receipt of an interrupt signal at the controller;

interrupting service to the first subscriber station in response to non-receipt of the interrupt signal;

detecting queuing selection and the presence of available queue space at the second hold queue;

sending an instruction to the controller to queue network-side traffic in response to queuing selected and available queue space; and temporarily storing the traffic in memory means during said service interruption.

40. A method as claimed in claim 39, comprising the further prior steps of:

examining incoming traffic at data flow control means for predetermined spoofing responses and acknowledgements in response to one of, the detected absence of queue space or specific selection; and disabling the protocol spoofing means and invoking one of, session reestablishment at the first subscriber station or generation of a return error condition signal thereat in response to specific selection or the absence of the predetermined spoofing responses and acknowledgments.

* * * * *